United States Patent [19]
Howlett

[11] 3,747,836
[45] July 24, 1973

[54] CANDY BOX

[76] Inventor: William Howlett, c/o Horton, Davis, McCaleb & Lucas, Suite 2040, 230 W. Monroe St., Chicago, Ill. 60606

[22] Filed: Mar. 23, 1972

[21] Appl. No.: 237,290

[52] U.S. Cl. .................................. 229/42, 229/15
[51] Int. Cl. ....................... B65d 3/24, B65d 85/00
[58] Field of Search .................. 229/2.5, 15, 29 M, 229/42; 206/46 FC, DIG. 29

[56] References Cited
UNITED STATES PATENTS
| 459,587 | 9/1891 | Leech | 229/42 |
| 3,046,617 | 7/1962 | Grayboff | 229/42 UX |
| 1,762,458 | 6/1930 | Wickert, Jr. | 206/DIG. 29 |
| 1,704,414 | 3/1929 | Weber | 229/42 UX |
| 3,516,596 | 6/1970 | Madden et al. | 229/42 |
| 3,565,321 | 2/1971 | Weiss | 229/15 |
| 3,578,235 | 5/1971 | Weiss | 229/15 |

FOREIGN PATENTS OR APPLICATIONS
| 1,122,436 | 1/1962 | Germany | 229/42 |

Primary Examiner—Davis T. Moorhead
Attorney—James A. Davis, William E. Lucas and Lawrence W. Brugman et al.

[57] ABSTRACT

Candy box with one-piece liner forming a plurality of transversely extending grooves and partitions having upper horizontal and transversely extending surfaces defining longitudinal margins along the grooves, a plurality of dividers in at least some of the grooves integral with the liner and spaced transversely to define with the groove walls a plurality of cells each adapted to receive at least one piece of a particular type of candy, indicia means on the upper horizontal surfaces individual to each cell to identify a particular type of candy, a box bottom housing the liner having marginal walls extending a predetermined distance above the horizontal partition surfaces, a cover, and a resilient pad having a thickness substantially equal to said predetermined distance for filling the space between the cover and the marginal walls of the bottom above the partitions, with thin-walled candy-receiving cup members in the grooves having downwardly converging side walls normally extending above the partitions for engagement by the pad to be flexed inwardly thereby when the several parts are assembled to additionally resiliently retain the candy pieces protectedly in the box.

3 Claims, 3 Drawing Figures

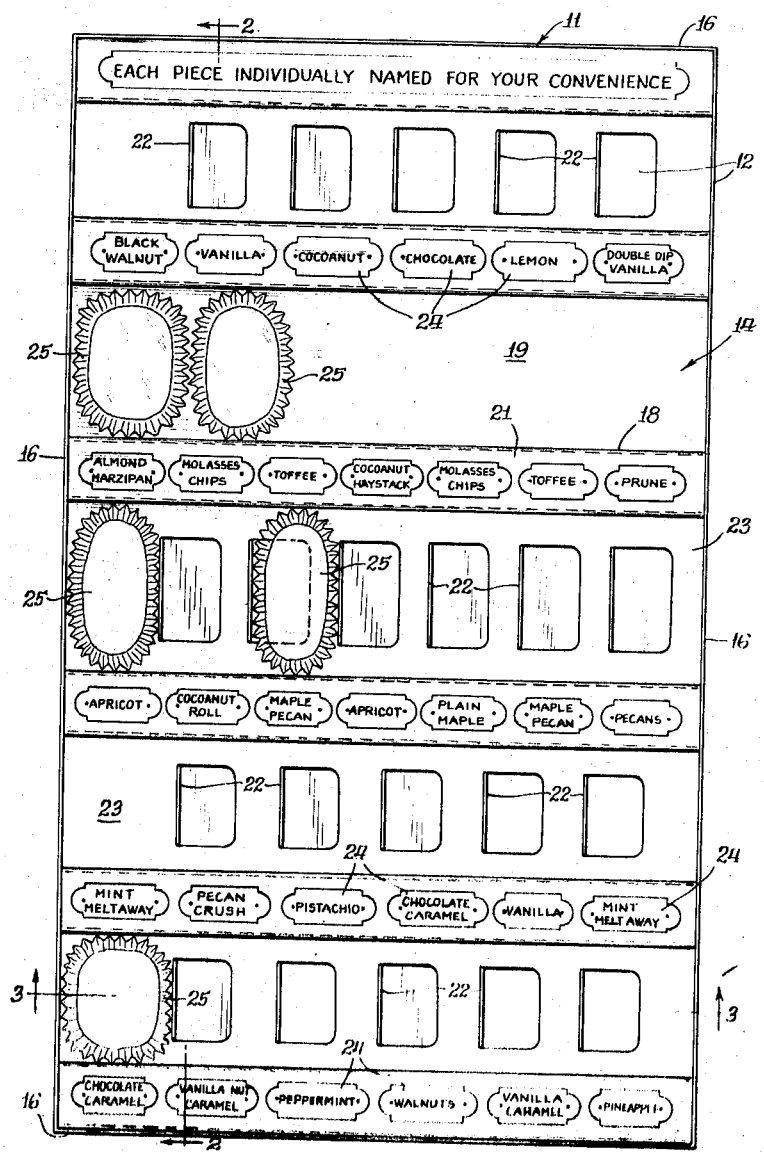

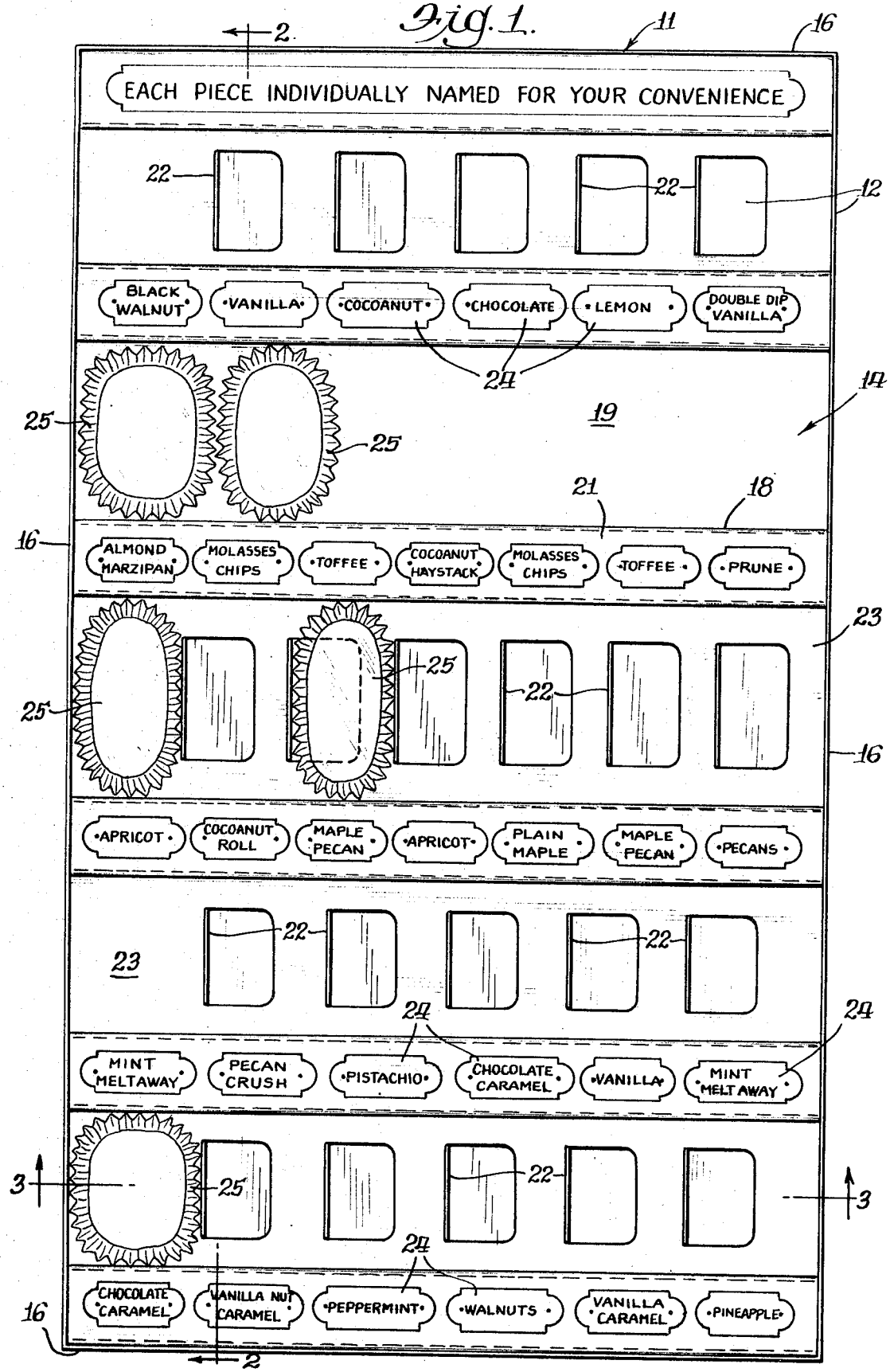

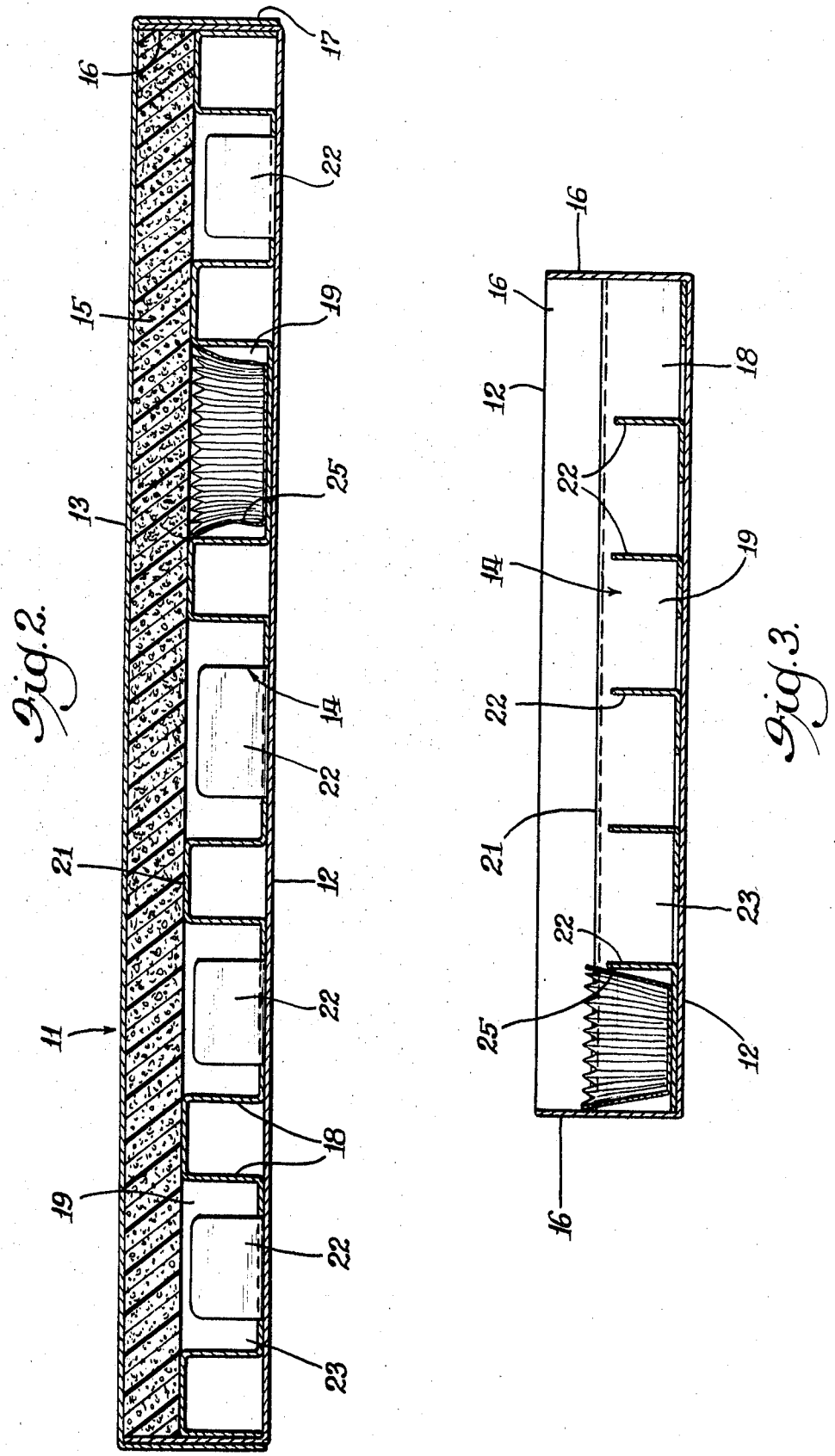

CANDY BOX

BACKGROUND OF THE INVENTION

1. Field of the Invention

This invention relates generally to compartmented containers, and more specifically to candy boxes.

2. Description of the Prior Art

Candy boxes heretofore have employed one-piece liners for forming a plurality of transversely extending grooves, and even have used tabs cut into, and folded up from, the groove bottoms to present longitudinally extending dividers defining cells for receiving pieces of candy, as in United States Letters Patent No. 459,587, but no known candy boxes have provided indicia adjacent and individual to such cells for identifying the different types or kinds of candy pieces in each cell so as to permit accurate selection of specifically desired candy pieces.

SUMMARY OF THE INVENTION

A principal object of the invention is to provide a candy box for most effectively protecting a plurality of pieces of choice candy of different types and enabling accurate selection of a piece of any particular type desired. This is accomplished by a one-piece liner comprising partitions defining a plurality of transversely extending grooves by means of upper horizontal surfaces, a plurality of dividers in each of at least some of the grooves spaced transversely to define a plurality of cells each adapted to receive at least one piece of a particular type of candy, and indicia means on the upper horizontal surfaces individual to the cells to clearly identify the different types of candy. A box bottom is employed for housing the liner having marginal walls extending a predetermined distance above the upper horizontal surfaces of the liner, with a cover and resilient pad means having a thickness substantially equal to that predetermined distance for effectively filling the space between the cover and the marginal walls of the bottom above the liner to cushion the candy pieces in their cells. The pieces of candy are additionally resiliently and protectedly retained in the box by means of thin-walled candy-receiving cup members in the liner grooves having downwardly converging side walls normally extending above the upper horizontal surfaces of the liner for engagement by the pad means to be flexed inwardly thereby, when the several parts are assembled, to resiliently engage the individual pieces of candy therein.

IN THE DRAWINGS

FIG. 1 is a top plan view of an empty candy box embodying the invention as it appears with the cover and resilient pad and most of the cup members removed;

FIG. 2 is a longitudinal vertical section taken substantially on the line 2—2 of FIG. 1, with the pad and cover in place; and FIG. 3 is a transverse vertical section taken substantially on the line 3—3 of FIG. 1.

DESCRIPTION OF THE PREFERRED EMBODIMENT

Referring more particularly to the drawings, reference numeral 11 indicates in general a candy box embodying the features of this invention which includes a bottom portion 12, a top portion 13, a unitary liner generally designated 14, and resilient pad means 15.

The marginal vertical walls 16 of the bottom portion 12, as shown in FIG. 2, extend above the liner 14 a predetermined distance to accommodate the pad 15, the latter having a thickness substantially equal to that predetermined distance so as to fill the space between the liner 14, those marginal walls 16 and the top portion 13. As is customary, the top portion or cover 13 is provided with vertical marginal walls 17 of substantially the same length as the cooperating walls 16 of the bottom portion 12.

The unitary or one-piece liner 14 herein illustrated is made from a single sheet of cardboard, or the like, scored transversely to provide fold lines so disposed and spaced longitudinally from each other that, when folded and placed within the lower part of the bottom portion 12, the liner 14 presents a plurality of vertical walls 18 defining a plurality of transversely extending grooves 19 spaced from each other by upper horizontal and transversely extending surfaces 21 which comprise the longitudinal margins along the grooves 19.

The bottom walls of at least some of the grooves 19 are provided with a plurality of U-shaped cuts having score lines closing the open sides of those U's so that longitudinally extending tabs 22 may be bent upwardly into vertical position on such score lines to provide a plurality of dividers integral with, and forming part of, the liner 14 and spaced transversely to define with the walls 18 of the associated grooves 19 a plurality of cells 23 each of which is adapted to receive at least one piece of a particular type of candy. It will be appreciated, of course, that the transverse or lateral spacings between adjacent tabs 22 will vary, as seen in FIG. 1, to accommodate different sizes of candy pieces. And if desired because of the peculiar nature or configuration of some particular candy pieces, such tabs 22 may be omitted from one or more of the grooves 19 or, if provided in the blank forming the liner 14, may be left in horizontal position defining a part of the bottom wall of the associated transverse groove. It also wll be appreciated that, although the liner 14 is illustrated herein as being formed by folding an originally flat sheet, it may be formed as a molded article of suitable plastic.

It will further be appreciated that the candy box of this invention is intended particularly for encasing a wide selection of choice or expensive candies and, in addition to providing maximum protection for the candy pieces, it affords accurate selection of a piece of any particular type included therein that may be desired. To this end, the upper horizontal surfaces 21 defining the lower margins of each of the transversely extending grooves 19, as seen in FIG. 1, are provided with indicia means 24 individual to the cells 23 or portions of the associated groove 19 to specifically identify the particular types of candy in the associated cells or portions of the adjacent groove. Thus, on contemplating the open box with the cover 13 and pad 15 removed, as in FIG. 1, will be enabled not only to observe what types of candy are contained therein, but also to accurately select a piece of any particular type desired and to be assured that the piece selected is that which the person wants.

The pieces of candy are additionally resiliently and protectively retained in the box when the pad 15 and top portion 13 are in operative position by means of thin-walled candy-receiving cups 25 in the line grooves 19 and the cells 23. As best seen in FIG. 3, the side walls of these cups 25 are downwardly converging and normally extend slightly above the upper horizontal surfaces 21 of the liner 14. Consequently, when the pad 15 is placed thereover and box 11 is closed by means of the top portion 13, those downwardly converging side walls of the cups 25 will be flexed inwardly in response to the upper edges of the cups being depressed by the pad 15, as illustrated in FIG. 2. This will result in each cup member 25 resiliently engaging the individual piece or pieces of candy therein to provide additional protection for those candy pieces.

It is thought that the invention and many of the attendant advantages will be understood from the foregoing description, and it will be apparent that various changes may be made in the form, construction, and arrangement of the parts without departing from the spirit and scope of the invention or sacrificing all of its material advantages, the form hereinbefore described being merely the preferred embodiment thereof.

I claim:

1. In a box for candy, a liner comprising a member forming a plurality of transversely extending grooves, each being adapted to receive a plurality of spearate candy pieces, and partitions having upper horizontal and transversely extending surfaces defining longitudinal margins along said grooves, a plurality of dividers in each of at least some of said grooves integral with and forming part of said liner and spaced transversely to define with the walls of the associated grooves a plurality of cells each adapted to receive at least one piece of a particular type of candy, and indicia means on said upper horizontal surfaces individual to said cells to identify said particular types of candy.

2. In a box for candy according to claim 1, a box bottom portion housing said liner having marginal walls extending a predetermined distance above said upper horizontal surfaces, a cover portion closing said bottom portion, and resilient pad means having a thickness substantially equal to said predetermined distance for effectively filling the space between said cover portion and said marginal walls above said upper horizontal surfaces.

3. In a box for candy according to claim 2, thin-walled cup members in said grooves having downwardly converging side walls normally extending above said horizontal surfaces for engagement by said pad means to be flexed inwardly thereby when said cover portion and pad means are placed on said box bottom portion with said liner and cup members therein.

* * * * *